(12) United States Patent
Krause et al.

(10) Patent No.: US 9,154,046 B2
(45) Date of Patent: *Oct. 6, 2015

(54) ROTATING RECTIFIER ASSEMBLY AND METHOD

(71) Applicant: Hamilton Sundstrand Corporation, Charlotte, NC (US)

(72) Inventors: Joseph Paul Krause, Downers Grove, IL (US); Dhaval Patel, Loves Park, IL (US); Glenn C. Lemmers, Jr., Loves Park, IL (US); Mark J. Franklin, Janesville, WI (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/774,977

(22) Filed: Feb. 22, 2013

(65) Prior Publication Data

US 2014/0241020 A1    Aug. 28, 2014

(51) Int. Cl.
| | |
|---|---|
| H02K 11/00 | (2006.01) |
| H02M 7/00 | (2006.01) |
| H02K 11/04 | (2006.01) |
| H02M 7/06 | (2006.01) |

(52) U.S. Cl.
CPC .............. *H02M 7/003* (2013.01); *H02K 11/042* (2013.01); *H02M 7/06* (2013.01); *Y10T 29/49002* (2015.01); *Y10T 29/49117* (2015.01)

(58) Field of Classification Search
USPC ............. 29/592.1, 610.1, 825, 832, 729, 739, 29/868, 874, 876, 877, 881; 310/68 D; 363/141, 145, 107, 108, 126
See application file for complete search history.

(56) References Cited

U.S. PATENT DOCUMENTS

| | | | |
|---|---|---|---|
| 4,918,343 A | 4/1990 | Heinrich et al. | |
| 4,959,707 A | 9/1990 | Pinchott | |
| 4,987,328 A | 1/1991 | Shahamat | |
| 5,587,616 A | 12/1996 | Johnsen | |
| 8,890,379 B2 | 11/2014 | Krause et al. | |
| 2010/0054005 A1* | 3/2010 | Grosskopf et al. | 363/126 |
| 2011/0175584 A1* | 7/2011 | Huber et al. | 323/282 |

FOREIGN PATENT DOCUMENTS

EP    1788693 A1    5/2007

OTHER PUBLICATIONS

European Search Report for Application No. 14156249.6-1804, Mailed May 26, 2014, 7 pages.

* cited by examiner

*Primary Examiner* — Matthew Nguyen
*Assistant Examiner* — Afework Demisse
(74) *Attorney, Agent, or Firm* — Cantor Colburn LLP (57) ABSTRACT

A rectifier assembly and method are provided. The rectifier assembly includes an annular bus bar including an electrically conductive material, and an insulator ring receiving the annular bus bar. The insulator ring defines radially-extending resistor pockets and diode pockets therein. The rectifier assembly also includes resistors disposed in the resistor pockets and electrically connected with the annular bus bar, and diodes disposed in the diode pockets and electrically connected with the annular bus bar. The rectifier assembly also includes an outer housing receiving the annular bus bar and the insulator ring, such that the insulator ring is positioned radially between the annular bus bar and the outer housing.

19 Claims, 7 Drawing Sheets

ROTATING RECTIFIER ASSEMBLY AND METHOD

TECHNICAL FIELD

The present disclosure relates generally to rotating rectifier assemblies.

BACKGROUND

Rectifiers are generally employed to convert AC voltage to DC voltage. For example, rectifiers may be used in conjunction with AC generators to convert and condition power so that it can be stored in a battery. One specific type of rectifier is a rotating rectifier assembly. Rotating rectifier assemblies are used in brushless wound field synchronous generators.

Brushless wound field synchronous generators include a main machine and a brushless excitation system. The main machine produces the output power of the generator and includes a main armature (stator) and a main field (rotor). The main armature includes a three phase winding. The main field includes a DC field winding which requires excitation voltage to create an electromagnet such that there are north-south pole pairs on the rotor. The main field rotates on the shaft, such that when DC voltage is sourced to it, an AC voltage is induced in the three phase winding included on the main armature. The induced AC voltage in the three phase winding is utilized for output power.

The brushless excitation system includes an exciter field (stator) and an exciter armature (rotor) and a rotating rectifier. The exciter field, similar to the main field, includes a winding that uses voltage to create an electromagnet. The exciter armature, similar to the main armature, includes a three phase AC winding. The exciter armature rotates on the shaft, such that when the exciter field is excited with DC voltage, an AC voltage is induced in the exciter armature. The rotating rectifier converts the AC voltage from the exciter armature to DC voltage. The DC voltage output from the rotating rectifier is applied to the main field. Such rectifiers are designed to rotate on the shaft with the exciter armature and the main field.

Rectifiers include a combination of diodes and a snubber circuit, which are electrically connected via bus bars and between an AC bus and a DC bus, so as to form a suitable rectifier circuit. The snubber circuit can include any series or parallel combination of resistors, capacitors and/or inductors to condition the voltage and current waveforms of the rectifier. The diodes, snubber circuit, and bus bars are typically embedded in recesses formed in an annular insulator ring. The insulator ring serves to electrically insulate the components, while providing structural support so as to maintain the position thereof. The bus bars, resistors, diodes, etc. are then fastened into place on the insulator ring. For example, the bus bars are fastened by screws on either end, with the screws also each fastening to a conductive spring. The springs, in turn, hold the diodes and resistors in place, while providing electrical connection with the bus bar. Each screw is threaded in from the inside diameter of the insulator ring outwards (i.e., "side inserted") into tapped holes formed in the insulator ring.

SUMMARY

Embodiments of the disclosure may provide a rectifier assembly. The rectifier assembly includes an annular bus bar including an electrically conductive material, and an insulator ring receiving the annular bus bar. The insulator ring defines radially-extending resistor pockets and diode pockets therein. The rectifier assembly also includes resistors disposed in the resistor pockets and electrically connected with the annular bus bar, and diodes disposed in the diode pockets and electrically connected with the annular bus bar. The rectifier assembly also includes an outer housing receiving the annular bus bar and the insulator ring, such that the insulator ring is positioned radially between the annular bus bar and the outer housing.

Embodiments of the present disclosure may also provide a method of manufacturing a rotating rectifier. The method includes inserting diodes and resistors radially inward into pockets extending at least partially radially through an insulator ring, and receiving the insulator ring with the diodes and resistors inserted therein into an outer housing. The method also includes receiving a monolithic annular bus bar comprising electrically conductive material into the insulator ring such that the insulator ring is radially intermediate the annular bus bar and the outer housing.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to various embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

Figure 1:
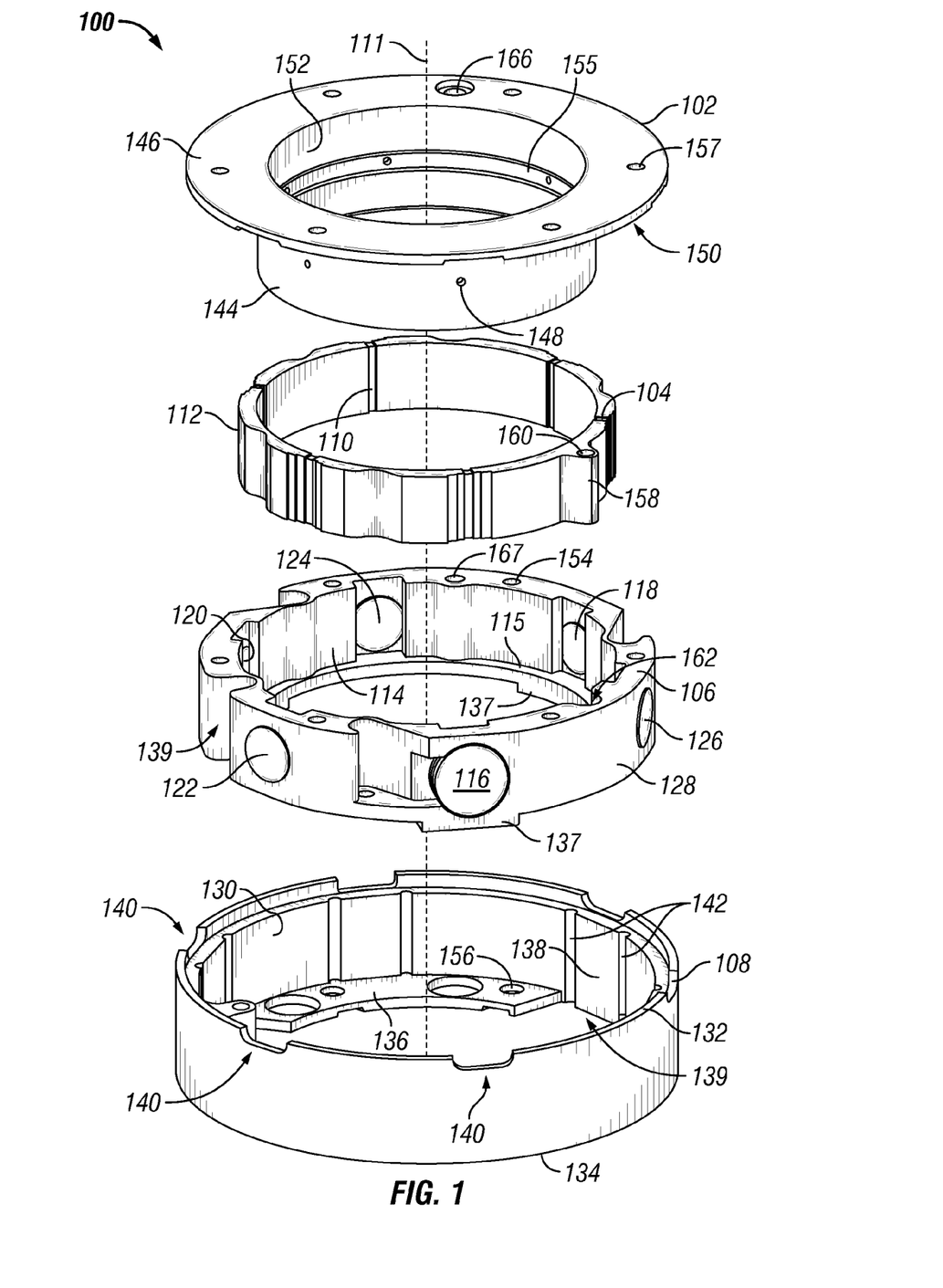
FIG. 1 illustrates a partial, exploded perspective view of a rotating rectifier assembly, according to an embodiment.

FIG. 1 illustrates a partial, exploded perspective view of a rotating rectifier assembly 100, according to an embodiment. The rotating rectifier assembly 100 generally includes a cover 102, an annular bus bar 104, an insulator ring 106, and an outer housing 108. The annular bus bar 104 may be generally rigid and may be generally toroidal in shape, extending about a central axis 111. The annular bus bar 104 may have any thickness suitable to provide sufficient electrical current carrying capacity and/or structural integrity in rotating embodiments. Further, the annular bus bar 104 may be of unitary construction, i.e., may be monolithic. The annular bus bar 104 may be constructed from one or more electrically conductive materials, such as, for example, copper.

Further, the annular bus bar 104 may have fluid channels 110 formed therein, which may extend axially along the annular bus bar 104, as shown. The annular bus bar 104 may also have one or more, for example six, contact spring reliefs 113 extending axially along and radially inwards from an outer diameter 112 of the annular bus bar 104.

The terms "axial" or "axially" and "radial" or "radially" are generally used herein to refer to directions in a cylindrical system, such as the illustrated embodiment of the rotating rectifier assembly 100. Accordingly, it will be appreciated that "axial" or "axially" refers to a direction parallel to or along the central axis 111 of the rotating rectifier assembly 100, while "radial" or "radially" refers to a direction extending perpendicular to the central axis 111.

As shown, the annular bus bar 104 may be received into the insulator ring 106, such that, for example, the outer diameter 112 of the annular bus bar 104 is adjacent to an inner surface 114 of the insulator ring 106 and abuts a radially and inwardly extending retaining wall 115 of the insulator ring 106. The outer diameter 112 of the annular bus bar 104 may be shaped (e.g., by casting, milling, cutting, etc.) to conform to the inner surface 114 of the insulator ring 106.

The insulator ring 106 may be formed from one or more insulating materials with suitable thermal and/or chemical resistance properties, such as, for example, a polyimide, a polyamide, a polyamide-imide, combinations thereof, or the like. In one specific embodiment, the insulator ring 106 may be formed at least partially from molded TORLON®. Further, the insulator ring 106 may be cast, molded, or otherwise formed so as to have a unitary construction, i.e., the insulator ring 106 may be monolithic.

The rectifier assembly 100 may further include one or more, for example, three pairs of diodes 116, 118, 120 and one or more, for example, three resistors 122, 124, 126. The combination of three pairs of diodes 116-120 and three resistors 122-126 may be suited for rectifying three-phase power; however, it will be appreciated that other numbers of diodes and resistors may be employed for other applications, without departing from the scope of the present disclosure. Further, the electrical functioning of the pairs of diodes 116-120 and the resistors 122-126 in a rectifier circuit will be appreciated by one of skill in the art. The diodes 116-120 and resistors 122-126 may be inserted into apertures, recesses, etc. that are formed in the insulator ring 106, as will be described in greater detail below. Moreover, the pairs of diodes 116-120 and the resistors 122-126 may be electrically connected to one another via the annular bus bar 104, which may be employed, e.g., instead of segments of bus bar strips.

The insulator ring 106 may be inserted into the outer housing 108, such that an outer surface 128 of the insulator ring 106 is adjacent to an inner diameter 130 of the outer housing 108. The outer housing 108 may have a first end 132 and a second end 134, each at opposite axial sides of the generally cylindrical outer housing 108. The insulator ring 106 may be inserted through the first end 132 to rest on a radially and inwardly projecting flange 136 at the second end 134 of the outer housing 108.

Additionally, the insulator ring 106 may include an alignment tabs or lugs 137, which extend axially therefrom. The alignment tabs 137 may be configured to slide into gaps 139 formed in the flange 136 of the outer housing 108. Accordingly, the alignment tabs 137 and the gaps 139 may cooperate to provide an anti-rotation and/or alignment feature between the insulator ring 106 and the outer housing 108. In other embodiments, the outer housing 108 may include the alignment tabs 137 and the insulator ring 106 may include the gaps 139. Further, various other types of anti-rotation and/or alignment features may be incorporated so as to align the insulator ring 106 and the outer housing 108 and/or to prevent relative rotation therebetween. In some embodiments, however, such alignment and/or anti-rotation feature(s) may be unnecessary and omitted.

The outer housing 108 may be constructed at least partially of a thermally and electrically conductive material. One example of such a material may be aluminum. Accordingly, the outer housing 108 may include six contact pads 138 (three visible in this view), one for each of the pairs of diodes 116-120 and one for each of the resistors 122-126. The contact pads 138 may be generally flat areas in the inner diameter 130 of the outer housing 108. Further, the contact pads 138 may be positioned so as to align with the diodes 116-120 and the resistors 122-126. As such, the outer housing 108, made of the electrically conductive material, may act as a second DC bus bar, with the annular bus bar 104 acting as the first.

The outer housing 108 may also include one or more, for example, six fluid outlet ports 140 (five are visible) formed proximal, e.g., extending from, the first end 132. The fluid outlet ports 140 may be disposed at regular angular intervals around the periphery of the first end 132 of the outer housing 108. In at least one embodiment, the fluid outlet ports 140 may be aligned with the contact pads 138. Furthermore, the outer housing 108 may define relief grooves 142 on either circumferential side of each of the contact pads 138. Each of the relief grooves 142 may be formed so as to provide the flattened section of the otherwise generally circumferential inner diameter 130 of the outer housing 108. The relief grooves 142 may serve a second function as well, providing a recessed conduit extending axially between the flange 136 and the ports 140.

With the annular bus bar 104 received into the insulator ring 106, and the insulator ring 106 received into the outer housing 108, the cover 102 may be secured into place on the second end 134 of the outer housing 108. The cover 102 may have a cylindrical body 144 and a flange 146 extending radially outward therefrom. The cylindrical body 144 may include one or more fluid inlet ports 148 (four are visible). In some embodiments, the fluid inlet ports 148 may be circular, but in others may be elongated slots or any other suitable shape. Further, the fluid inlet ports 148 may be disposed in a groove 155, which may be formed in an inner diameter 152 of the cylindrical body 144 so as to provide a flowpath to the fluid inlet ports 148.

Moreover, the cylindrical body 144 of the cover 102 may be received into the annular bus bar 104 and into engagement with the flange 136 of the outer housing 108. The cover 102 may thus be received into the annular bus bar 104, such that the flange 146 is flush with the first end 132 of the outer housing 108. In some cases, the flange 146 may be a generally planar disk, but in other embodiments, as shown, may include one or more cutouts 150 (three are visible), which may be disposed about the periphery of the flange 146, for example, configured to align with the ports 140 of the outer housing 108, so as to cooperatively provide a fluid passage extending radially outward from the rectifier assembly 100. The cover 102 may be made of any suitable insulating material with desired properties such as, for example, those discussed above with respect to the insulator ring 106. In any particular embodiment, however, the cover 102 and the insulator ring 106 may or may not be made of the same material.

The flange 146 may be secured to the flange 136 of the outer housing 108, for example, via screws extending through holes 157 in the flange 146, through bores 154 defined in the insulator ring 106 and, for example, threading through tapped holes 156 defined in the flange 136. In other embodiments, the holes 156 may not be tapped and nuts may be provided on the lower side, so as to secure the screws in place. Such nuts (not shown) may be "captive" such that they are prevented from rotating relative to the outer housing 108 while being threaded to the screws, for example, by a non-circular head that is received into a non-circular chamfer.

Further, the annular bus bar 104 and/or the insulation ring 106 may include an alignment or anti-rotation feature. For example, the annular bus bar 104 may include an alignment protrusion 158, which may have a bore 160 defined therein and extending axially therethrough. The bore 160 may serve as an electrical connection to support the functioning of the rectifier assembly 100. The alignment protrusion 158 may be received into an alignment recess 162, defined in the insulator ring 106 and extending outward from the inner surface 114 thereof. The retaining wall 115 may define a hole 164 aligned with the alignment recess 162. Further, the flange 146 of the cover 102 may define an alignment hole 166, which may be aligned with the bore 167. Accordingly, when the annular bus bar 104 is received into the insulator ring 106, the alignment protrusion 158 may be received into the alignment recess 162, so as to prevent relative rotation between the annular bus bar 104 and the insulation ring 106. When the cover 102 is secured onto the outer housing 108, a bolt, post, pin, etc. may be received through the bore 167, through the alignment hole 166. In other embodiments, the bolt, post, bar, etc. may be retained extending through at least the bore 167 and one of the alignment holes 166 and/or 167 in any other manner.

Figure 2:
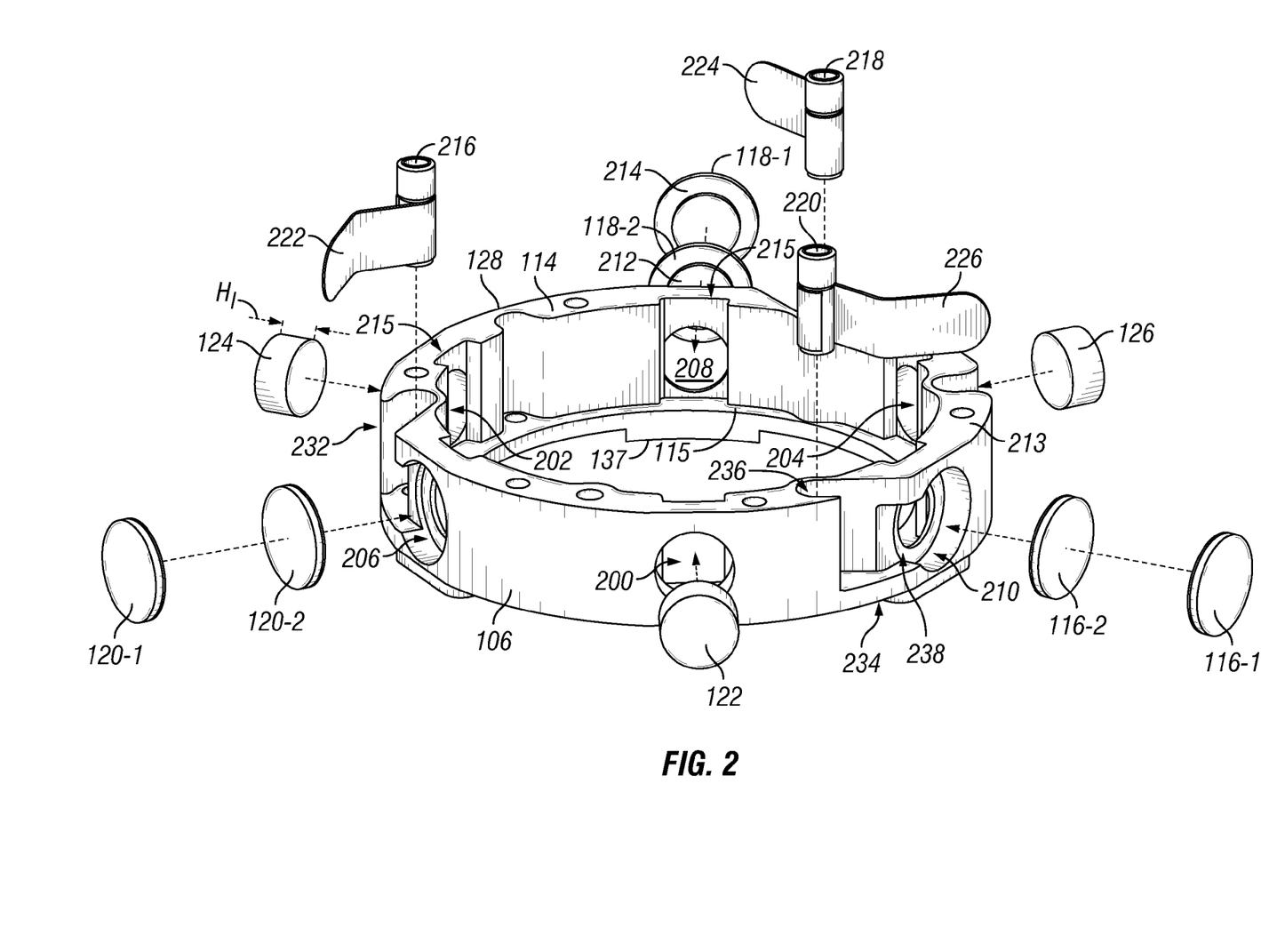
FIG. 2 illustrates an exploded perspective view of an insulator ring of the rotating rectifier assembly, according to an embodiment.

FIG. 2 illustrates an exploded view of the insulator ring 106, the pairs of diodes 116-120, and the resistors 122-124, according to an embodiment. With continuing reference to FIG. 1, the insulator ring 106 may have an alignment and/or an anti-rotation feature configured to engage the outer housing 108 and prevent relative rotation therebetween. For example, the insulator ring 106 may include an alignment tab 137 extending axially therefrom, as shown, toward the second end 134 of the outer housing 108 (FIG. 1). The alignment tab 137 may align with a gap in the flange 136 of the outer housing 108. The alignment tab 137 may also serve to provide sufficient material in insulator ring 106 to support diodes 116-118. In other embodiments, other types of alignment/anti-rotation features may be employed instead of or in addition to the alignment tab 137. However, in some embodiments, such a feature may be omitted.

Figure 3:
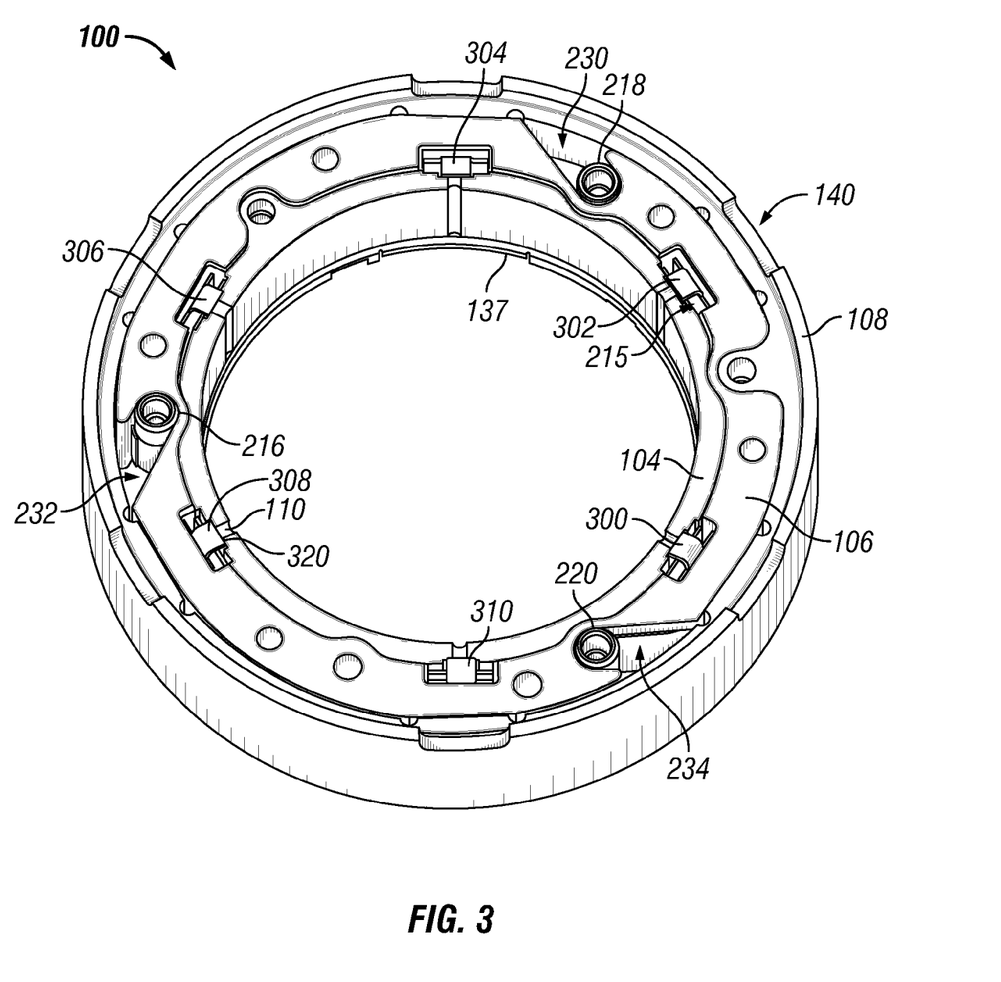
FIG. 3 illustrates a top perspective view of the rotating rectifier assembly, with the cover removed, according to an embodiment.

With continuing reference to FIG. 2, FIG. 3 illustrates a top perspective view of the rectifier assembly 100, with the cover 102 removed, according to an embodiment. Each of the resistors 122-124 may be received into a resistor pocket 200, 202, 204 defined in the insulator ring 106. The resistor pockets 200, 202, 204 may be disposed at approximately equal intervals around the insulator ring 106. The resistor pockets 200-204 may extend radially inward between the inner and outer surfaces 114, 128 of the insulator ring 106. Further, as best viewable for resistor pocket 200, the resistor pockets 200-204 may have a stepped profile, such that the resistor pockets 200-204 have a greater radius at the outer surface 128 than at an area proximal the inner surface 114. The smaller radius may be smaller than the radius of the resistors 122-126, such that the stepped profile prevents the resistors 122-126 from proceeding through the insulator ring 106 from the outer surface 128 toward and out through the inner surface 114.

Similarly, the pairs of diodes 116, 118, 120 (which, as shown, may each include two diodes 116-1 and 116-2, 118-1 and 118-2, and 120-1 and 120-2 stacked together) may each be received into a diode pocket 206, 208, 210, with the diode pockets 206-210 being disposed at approximately equal 120 degree intervals around the insulator ring 106. The diode pockets 206-210 may include a stepped profile, so as to prevent the diodes 116-120 from travelling through the inner surface 114 of the insulator ring 106. In various embodiments, the diodes 116-120 may be shaped as a stepped cylinder, with the smaller diameter portion 212 (visible for diode 118-2) facing radially inward and a larger diameter portion 214 facing radially outward. In such cases, the radius of the diode pocket 206-210 at the inner surface 114 may be less than the radius of the smaller diameter portion 212, or less than a radius of a larger portion 214 thereof.

The insulator ring 106 may also include spring recesses 215 at the inner surface 114, aligned with each of the resistor pockets 200-204 and at each of the diode pockets 206-210. In an embodiment, the spring recesses 215 may extend downward from an end 213 of the insulator ring 106 and to the retaining wall 115 thereof and may have a generally rectangular profile. In other embodiments, other shapes and locations may be employed.

The rotating rectifier assembly 100 (FIG. 1) may also include one or more AC posts 216, 218, 220, each with a conductive AC tab 222, 224, 226 extending therefrom. Further, the insulator ring 106 may define AC bus pockets 230, 232, 234 (234 is visible in FIG. 3). Each of the AC bus pockets 230-234 may be disposed circumferentially adjacent to one of the diode pockets 206-210. Further, each of the AC bus pockets 230-234 may include a cylindrical portion 236 sized to receive one of the AC posts 216-220, and a circumferential extension 238 sized to receive the AC tab 222-226 extending therefrom.

Accordingly, once assembled, an end of each of the AC tabs 222-226 may be sandwiched between the radially inward diode 116-2, 118-2, 120-2 and the radially outward diode 116-1, 118-1, 120-1, such that the AC tabs 222-226 provide an electrical lead between the AC post 216-220 and the diodes 116-118, enabling the AC posts 216-220 to act as AC buses. Once assembled, each outer diode 116-1, 118-1, 120-1, as well as the resistors 122-126, may be positioned radially such that their outer surface is in physical contact with the electrically conductive outer housing 108 serving as a DC bus.

Figure 4:
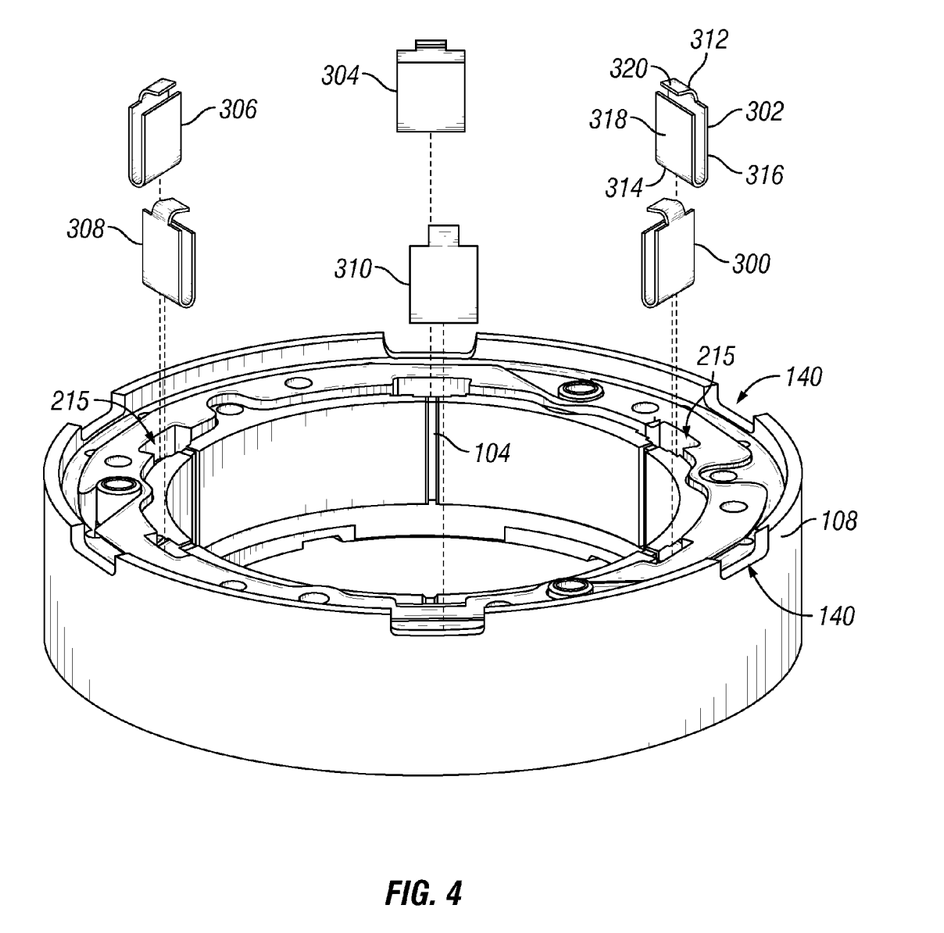
FIG. 4 illustrates a partial, exploded perspective view of spring clips being inserted into the rotating rectifier assembly, according to an embodiment.

With continuing reference to FIG. 3, FIG. 4 additionally illustrates insertion of electrical conductors, for example, spring clips 300, 302, 304, 306, 308, 310, so as to electrically connect the diodes 116-120 and resistors 122-126 (e.g., FIG. 1) with the annular bus bar 104. The spring clips 300-310 may be inserted into the spring recesses 215 defined by the insulator ring 106 and the contact spring reliefs 113 of the annular bus bar 104. Each of the springs 300-310 may include one or more, for example, two bends 312, 314, and two generally flat contact portions 316, 318. Further, each of the spring clips 300-310 may include a flow diverter 320, which may take the form of a tab, as shown, that extends past the edge of the contact portion 316. The flow diverter 320 may also act as an insertion assistance feature for the spring clips 300-310. Furthermore, each of the spring clips 300-310 may be constructed from an electrically conductive material, such as aluminum or copper, with a suitable resiliency and electrical conductivity. Accordingly, when inserted into the spring recesses 215, the conductive spring clips 300-310 provide electrical connectivity between the annular bus bar 104 and the adjacent resistor 122-126 or diode pair 116-120 via the contact portions 316, 318. Furthermore, the flow diverter 320 may align with the fluid channel 110 formed in the annular bus bar 104, such that the flow diverter 320 obstructs or hangs over the fluid channel 110, as best shown in FIG. 3 (indicated for spring clip 308), thereby directing fluid towards the resistor 122-126 or diode pair 116-120.

Figure 5:
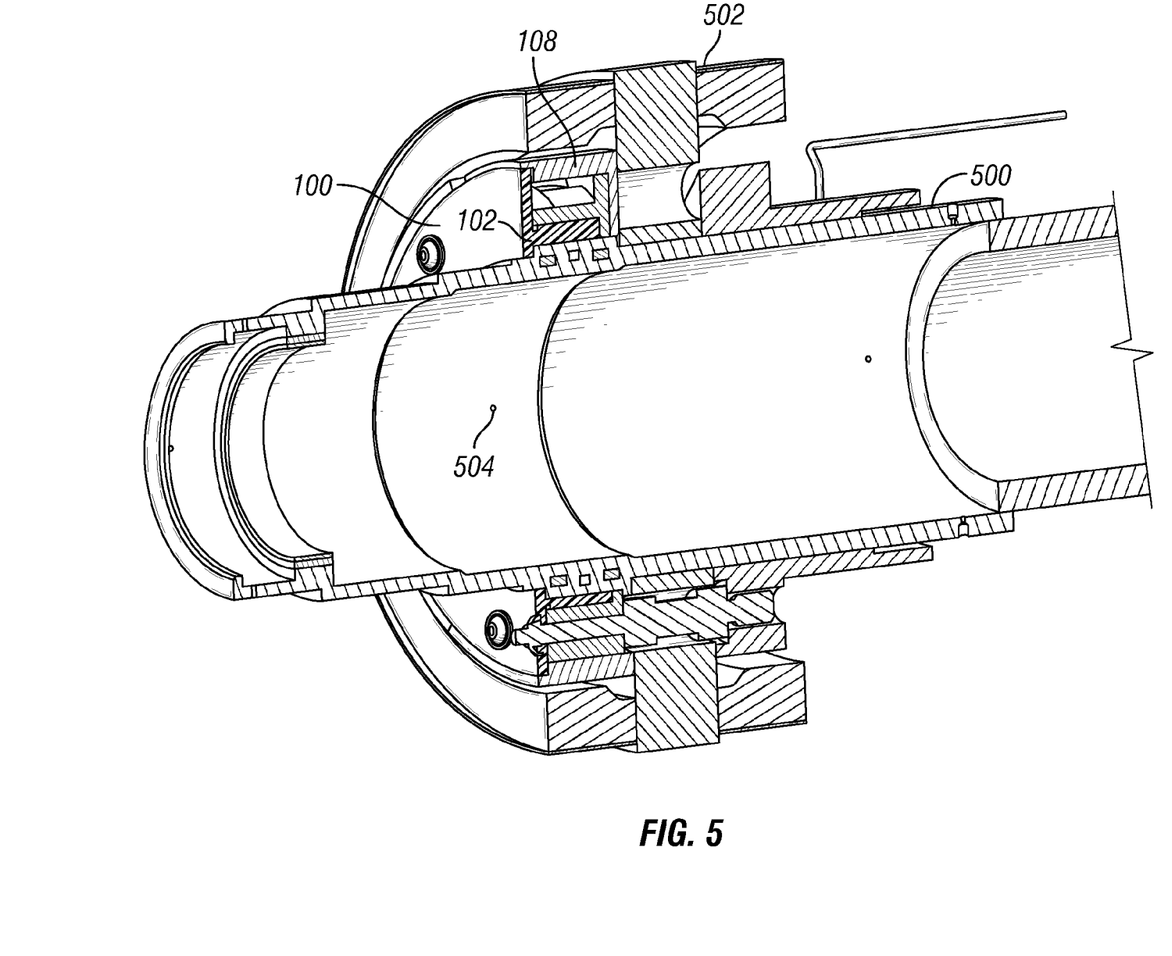
FIG. 5 illustrates a sectional view of the rotating rectifier assembly mounted to a shaft adjacent to an exciter, according to an embodiment.

FIG. 5 illustrates a sectional view of the rotating rectifier assembly 100 mounted to a shaft 500 so as to rotate therewith, according to an embodiment. As shown, the rectifier assembly 100 may be disposed adjacent to, e.g., abutting, an exciter 502 of a brushless alternator system. Further, the shaft 500 may be hollow, and may have a coolant flowpath defined therein. The shaft 500 may also include coolant delivery holes 504 extending therefrom.

Referring now additionally to FIG. 1, the coolant delivery holes 504, in operation, may fluidly communicate coolant from the hollow interior of the shaft 500 to the fluid inlet ports 148 of the cover 102 (FIG. 1) of the rectifier assembly 100. The coolant may then enter the interior of the rectifier assembly 100. The coolant may be driven by pressure or, when the shaft is rotating, by inertial forces radially outward. Thus, the coolant may proceed axially, in either direction, along the annular bus bar 104 after being received through the fluid inlet ports 148. For example, the coolant may tend to migrate to the slightly increased radius of the fluid channels 110, and then proceed axially toward or away from the flow diverters 320. Thereafter, the coolant may be received between the annular bus bar 104 and the insulator ring 106, particularly in the spring recesses 215 with the aid of the flow diverters 320. Further, the coolant may proceed in either axial direction and then radially outwards and into the annulus defined between the insulator ring 106 and the outer housing 108.

The coolant may flood the area between the outer housing 108 and the diodes 116-120 and the resistors 122-126. The resistor pockets 200-204 and the diode pockets 206-210 provide an annulus between the diode pairs 116-120 and resistors 122-126, thus providing a space through which the coolant may flow and absorb heat. Once reaching the outer housing 108, the coolant may accumulate at the relief grooves 142 and then flow out of the rectifier assembly 100 via the fluid outlet ports 140. Accordingly, via this fluid circuit, coolant fluid may be fluidly communicated between the fluid inlet ports 148 and the fluid outlet ports 140.

Referring again to FIG. 5, as shown, the thermally conductive outer housing 108 may be disposed adjacent to, e.g., abutting the exciter 502. Accordingly, the outer housing 108 may transfer heat to the exciter 502 by conduction, thereby assisting the cooling provided by the coolant circuit described above. The electrically conductive outer housing, also acting as a DC bus, may be in contact with the exciter 502, thereby providing an electrical grounding path for the rectifier assembly 100.

Figure 6:
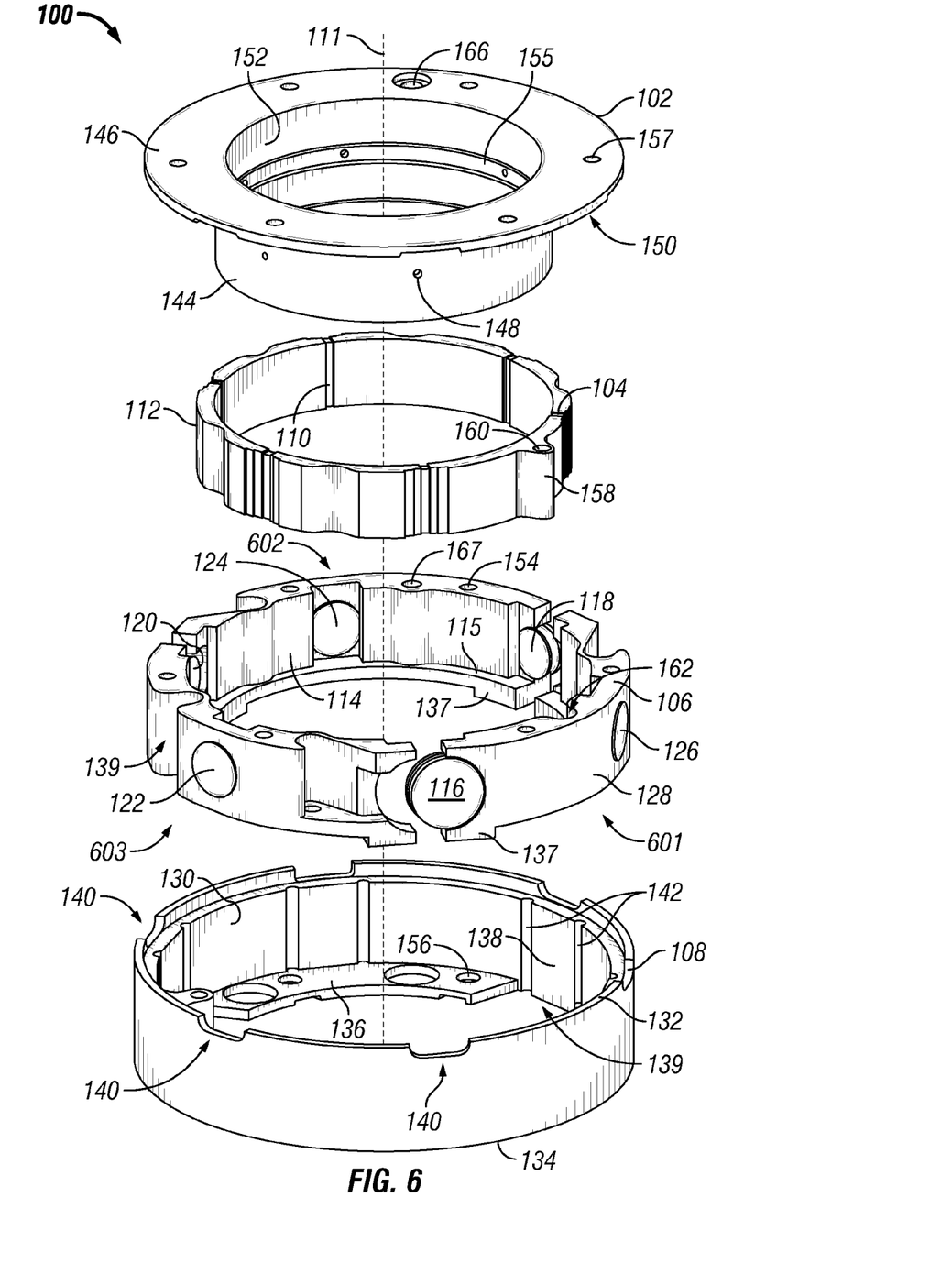
FIG. 6 illustrates another embodiment of the rotating rectifier assembly.

FIG. 6 illustrates another embodiment of the insulator ring 106, which may be similar to the embodiment of FIG. 1. As shown, instead of being a monolithic structure, the insulator ring 106 may be provided in two or more, for example, three segments 601, 602, 603. In an embodiment, each segment 601-603 may contain one of the resistors 122-126 and one of the AC bus pockets 230-234, with each segment 601-603 terminating circumferentially at the middle of one of the diode pockets 206-210, so as to contain a portion of the diode pockets 206-210. In other embodiments, the segments 601-603 may be split in other locations, and the segments may or may not be of uniform dimensions. Further, it will be appreciated that additional or fewer segments 601-603 may be employed. The segmenting of the insulator ring 106 may provide a reduced-stress embodiment, where the segments 601-603 are able to migrate radially outwards to rest against the outer housing 108 for support under high rotation conditions.

Figure 7:
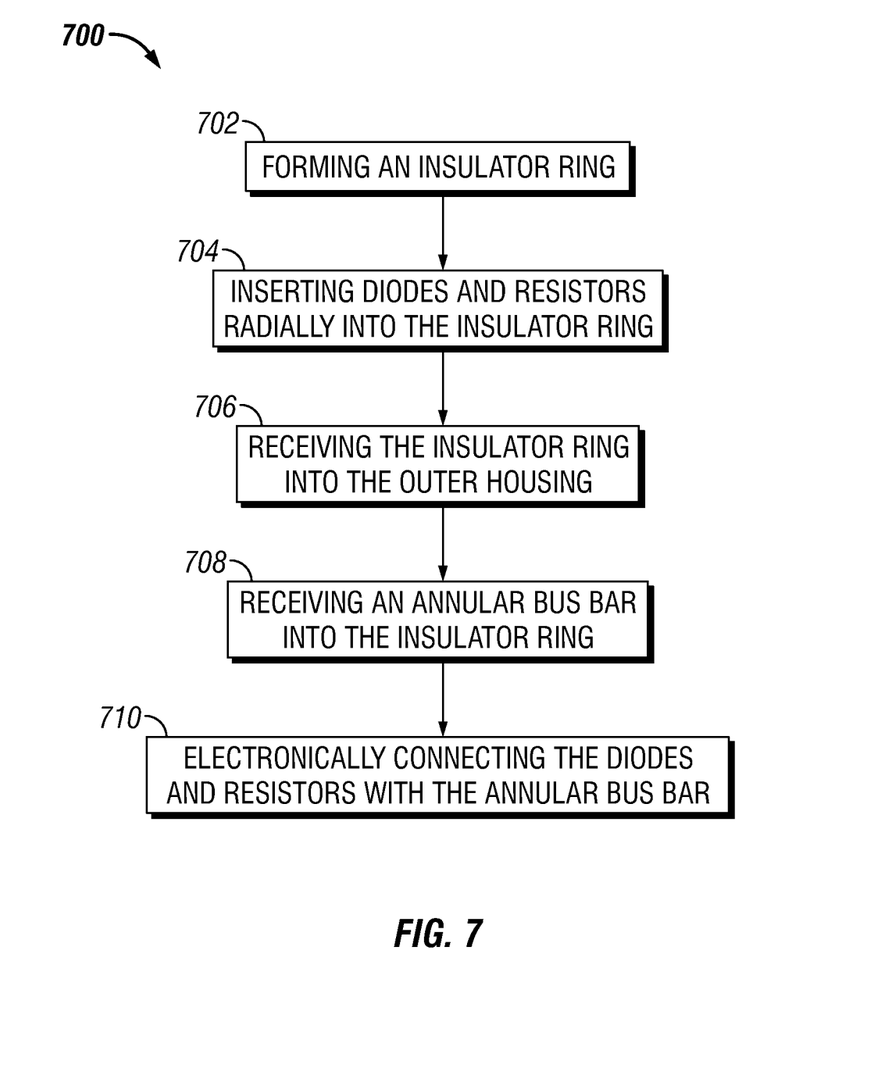
FIG. 7 illustrates a flowchart of a method for manufacturing a rotating rectifier assembly, according to an embodiment.

FIG. 7 illustrates a flowchart of a method 700 for manufacturing a rotating rectifier assembly, according to an embodiment. The method 700 may proceed so as to result in an assembled rotating rectifier assembly 100, and may thus be best understood with reference to the embodiments thereof illustrated in FIGS. 1-6. However, it will be appreciated that the method 700 is not limited to any particular structure, unless otherwise expressly stated herein.

The method 700 may proceed by forming the insulator ring 106, as at 702, for example, by casting, molding, or the like. In at least one embodiment, forming the insulator ring 106 may be free from secondary machining operations. In another embodiment, forming the insulator ring 106 may be free from secondary machining operations that require a tool to access the inner surface 114 and, for example, make cuts into the inner surface 114. For example, the simplified geometry and reduced fastener and/or component counts provided by the monolithic, annular bus bar 104 may avoid such secondary machining.

The method 700 may then proceed to inserting one or more resistors 122-126, one or more diode pairs 116-120, and one or more AC posts 218-222 and AC tabs 224-228 into their respective pockets 200-204, 206-210, 232-236, as at 704. In an embodiment, the radially inward diodes 116-2, 118-2, 120-2 may be inserted before the AC tabs 224-228, with the radially outward diodes 116-1, 118-1, 120-1 being inserted after the AC tabs 224-228, such that the AC tabs 224-228 may be disposed between the diode pairs 116, 118, 120. The AC tabs 224-228 may be placed by folding the tabs 224-228 and/or by rotating the AC posts 218-222.

The method 700 may further include receiving the insulator ring 106, for example, after the inserting at 704, into the outer housing 108, as at 706. In an embodiment, the insulator ring 106 may be aligned with the outer housing 108 using an alignment feature, as discussed above, or may be arranged and aligned without such a feature. In an embodiment, the bores 154 of the insulator ring 106 may be aligned with the holes 156 in the flange 136 of the outer housing 108. Further, the diodes 116-120 and resistors 122-126 may be aligned with the contact pads 138 of the outer housing 108. In segmented embodiments of the insulator ring 106 (e.g., FIG. 6), the segments 601-603 may be inserted in sequence or all at once.

Further, nuts (not shown) may be received into the holes 156, from the bottom, opposite the insulator ring 106. In an embodiment, the nuts may be held captive, e.g., by having an anti-rotation coupling (e.g., a non-circular head coupled with a non-circular chamfer). In other embodiments, such an anti-rotation coupling may be omitted. Further, in some cases, the holes 156 may be threaded, allowing the nuts to be omitted. In some other cases, rivets, welds, etc. may be employed instead of or in addition to such nuts and/or holes 156.

In an embodiment, the method 700 may then proceed to receiving the annular bus bar 104 into the insulator ring 106, as at 708. The annular bus bar 104 and the insulator ring 106 may cooperate to provide an anti-rotation feature, which may be engaged by receiving the annular bus bar 104 into the insulator ring 106. For example, the alignment protrusion 158 may be received into the alignment recess 162.

The method 700 may also include inserting the springs 300-310 into the spring recesses 215 of the insulator ring 106, as at 710. In one embodiment, the springs 300-310 may be received into the recesses 215 after the annular bus bar 104 is received into the insulator ring 106. In such an embodiment, the springs 300-310 may be slid into place through the top of the spring recesses 215 and towards the retaining wall 115. In another embodiment, the springs 300-310 may be placed into the recesses 215 and then the annular bus bar 104 may be received at 708. Next, the method 700 may include securing the cover 102 through the annular bus bar 104 and to the outer housing 108, for example, by threading screws through the holes 157 in the flange 146 of the cover 102.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings.

It will be appreciated that structural components and/or processing stages may be added or existing structural components and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side," "higher," "lower," "over," "top," and "under" are defined with respect to the conventional plane or working surface, regardless of the orientation of the workpiece.

What is claimed is:

1. A rectifier assembly, comprising:
    an annular bus bar comprising an electrically conductive material, annular bus bar defining flow channels extending axially on an inner diameter thereof;
    an insulator ring receiving the annular bus bar, the insulator ring defining radially-extending resistor pockets and diode pockets therein;
    resistors disposed in the resistor pockets and electrically connected with the annular bus bar;
    diodes disposed in the diode pockets and electrically connected with the annular bus bar; and
    an outer housing receiving the annular bus bar and the insulator ring, such that the insulator ring is positioned radially between the annular bus bar and the outer housing;
    spring clips disposed between and electrically connecting at least some of the resistors, at least some of the diodes, or both with the annular bus bar, each of the spring clips defining a flow diverter, the flow diverter of each of the spring clips extending at least partially over one of the flow channels.

2. The rectifier assembly of claim 1, wherein the insulator ring defines spring recesses extending from an inner surface thereof, the spring recesses each aligned with one of the resistor pockets or with one of the diode pockets, the spring recesses each being configured to receive one of the spring clips.

3. The rectifier assembly of claim 1, wherein the insulator ring further defines AC bus pockets extending from an outer diameter of the insulator ring, wherein the AC bus pockets each comprise a cylindrical portion and a tab portion, wherein the tab portion of each of the AC bus pockets communicates with one of the diode pockets.

4. The rectifier assembly of claim 3, further comprising:
    AC posts each disposed in the cylindrical portion of one of the AC bus pockets; and
    AC tabs electrically connected with the AC posts and the diodes, each of the AC tabs being disposed in the tab portion of one of the AC bus pockets.

5. The rectifier assembly of claim 4, wherein each of the diode pockets receives two of the diodes, wherein the AC tabs are each disposed between two of the diodes.

6. The rectifier assembly of claim 1, wherein the insulator ring comprises arcuate segments.

7. The rectifier assembly of claim 6, wherein the arcuate segments each include one of the resistor pockets and at least a portion of one of the diode pockets.

8. The rectifier assembly of claim 1, wherein each of the diode pockets includes a stepped profile, such that the diodes are prevented from sliding radially inward through the diode pockets.

9. The rectifier assembly of claim 1, wherein each of the resistor pockets includes a stepped profile, such that the resistors are prevented from sliding radially inward through the diode pockets.

10. The rectifier assembly of claim 1, wherein the outer housing comprises an electrically and thermally conductive material.

11. The rectifier assembly of claim 1, further comprising:
    a cover coupled with the outer housing, the cover comprising a cylindrical body extending through the annular bus bar and a flange extending radially outward so as to cover an open end of the outer housing, the cylindrical body of the cover defining one or more fluid inlet ports extending radially therethrough, wherein the outer housing at least partially defines one or more fluid outlet ports in fluid communication with the one or more fluid inlet ports.

12. The rectifier assembly of claim 11, wherein:
the annular bus bar defines one or more fluid channels therein configured to receive coolant from the one or more fluid inlet ports;
the insulator ring defines one or more spring recesses configured to at least partially contain a spring clip and to receive the coolant from the one or more fluid channels of the annular bus bar, the insulator ring further receiving the coolant in the resistor pockets, the diode pockets, or both; and
the outer housing defining one or more relief grooves extending radially inward from an inner diameter thereof and extending axially to the one or more fluid outlet ports.

13. The rectifier assembly of claim 1, further comprising an anti-rotation feature configured to prevent the annular bus bar from rotating relative to the insulator ring, to prevent the insulator ring from rotating relative to the outer housing, or both.

14. A method of manufacturing a rotating rectifier, comprising:
inserting a group of diodes and a group of resistors radially inward into pockets extending at least partially radially through an insulator ring such that at least one the group of diodes and the group of resistors define a stepped profile that prevents radially inward sliding through the pockets;
receiving the insulator ring with the diodes and resistors inserted therein into an outer housing; and
receiving a monolithic annular bus bar comprising electrically conductive material into the insulator ring such that the insulator ring is radially intermediate the annular bus bar and the outer housing.

15. The method of claim 14, wherein receiving the annular bus bar and the insulator ring into the outer housing comprises electrically connecting the diodes and resistors with the outer housing, wherein the outer housing is electrically and thermally conductive.

16. The method of claim 14, further comprising electrically connecting the annular bus bar with at least some of the diodes and at least some of the resistors.

17. The method of claim 16, wherein electrically connecting the annular bus bar with the at least some of the diodes and the at least some of the resistors comprises inserting spring clips between the annular bus bar and the insulator ring.

18. The method of claim 16, wherein electrically connecting the annular bus bar with the at least one of the diodes and the at least some of the resistors comprises placing spring clips into contact with the at least some of the diodes and the at least some of the resistors before receiving the annular bus bar into the insulator ring.

19. A rectifier assembly, comprising:
an annular bus bar comprising an electrically conductive material;
an insulator ring receiving the annular bus bar, the insulator ring defining radially-extending resistor pockets and diode pockets therein;
resistors disposed in the resistor pockets and electrically connected with the annular bus bar;
diodes disposed in the diode pockets and electrically connected with the annular bus bar;
an outer housing receiving the annular bus bar and the insulator ring, such that the insulator ring is positioned radially between the annular bus bar and the outer housing; and
a cover coupled with the outer housing, the cover comprising a cylindrical body extending through the annular bus bar and a flange extending radially outward so as to cover an open end of the outer housing, the cylindrical body of the cover defining one or more fluid inlet ports extending radially therethrough, wherein the outer housing at least partially defines one or more fluid outlet ports in fluid communication with the one or more fluid inlet ports.

* * * * *